United States Patent
Carlucci et al.

(10) Patent No.: US 11,141,739 B2
(45) Date of Patent: Oct. 12, 2021

(54) DEVICE FOR THE TREATMENT AND SEPARATION OF INORGANIC SOLID WASTE

(71) Applicants: GRYCLE S.R.L., Castelsaraceno (IT); Edoardo Carlucci, Castelsaraceno (IT)

(72) Inventors: Edoardo Carlucci, Castelsaraceno (IT); Daniele Pes, Milan (IT)

(*) Notice: Subject to any disclaimer, the term of this patent is extended or adjusted under 35 U.S.C. 154(b) by 2 days.

(21) Appl. No.: 16/756,183

(22) PCT Filed: Oct. 16, 2018

(86) PCT No.: PCT/IB2018/058002
§ 371 (c)(1),
(2) Date: Apr. 15, 2020

(87) PCT Pub. No.: WO2019/077483
PCT Pub. Date: Apr. 25, 2019

(65) Prior Publication Data
US 2021/0129156 A1    May 6, 2021

(30) Foreign Application Priority Data

Oct. 16, 2017    (IT) .......................... 102017000116498

(51) Int. Cl.
*B03B 9/06* (2006.01)
*B09B 3/00* (2006.01)
(Continued)

(52) U.S. Cl.
CPC .................. *B03B 9/06* (2013.01); *B09B 3/00* (2013.01); *B65F 1/0033* (2013.01); *B65F 2001/1489* (2013.01)

(58) Field of Classification Search
CPC .... B07C 5/02; B07C 5/16; B07C 5/34; B07C 5/3425; B07C 5/362; B07C 2501/0054;
(Continued)

(56) References Cited

U.S. PATENT DOCUMENTS 3,650,396 A     3/1972  Gillespie et al.
5,259,304 A  *  11/1993 Roberts ................. B30B 9/3064
                                                    100/215
(Continued)

FOREIGN PATENT DOCUMENTS

EP          1052021         11/2000
WO      2013128351 A1      9/2013

OTHER PUBLICATIONS

International Search Report for PCT/IB2018/058002, dated Feb. 15, 2019.

*Primary Examiner* — Joseph C Rodriguez
(74) *Attorney, Agent, or Firm* — Patterson Intellectual Property Law, P.C.; Gary L. Montle

(57) ABSTRACT

The invention relates to a device for the treatment and separation of inorganic solid wastes that can be used, for example, at home and/or near waste disposal areas. The device comprises a grinding chamber for obtaining waste fragments from a group of inorganic wastes and a sieving assembly of the fragments generated in said chamber. The device according to the invention also comprises a recognition assembly for recognizing the type of waste of each individual fragment and a distribution group, operatively interposed between the sieving assembly (6) and the recognition assembly, to place each individual fragment in a corresponding location of analysis of a recognition plate (9) of the recognition group. The device according to the invention is further provided with a monitoring and drive unit (200) configured to act on the recognition plate (9) so as to deposit each single analyzed waste fragment in a respective collection bin (13).

20 Claims, 9 Drawing Sheets

(51) Int. Cl.
*B65F 1/00* (2006.01)
*B65F 1/14* (2006.01)

(58) Field of Classification Search
CPC . B03B 9/06; B02C 23/08; B02C 23/10; B65F 1/0033; B65F 1/04
See application file for complete search history.

(56) References Cited

U.S. PATENT DOCUMENTS

| | | | | |
|---|---|---|---|---|
| 5,447,017 | A * | 9/1995 | Becher | B09B 3/0025 53/121 |
| 8,205,813 | B2 * | 6/2012 | Lambert | B09B 3/00 241/19 |
| 8,322,640 | B2 * | 12/2012 | Langston | B02C 23/18 241/29 |
| 8,452,445 | B2 * | 5/2013 | Becker | B07C 5/3425 700/223 |
| 8,550,252 | B2 * | 10/2013 | Borowski | B65F 1/1638 209/3 |
| 8,555,781 | B1 * | 10/2013 | Garcia | B65F 1/0033 100/223 |
| 8,632,024 | B2 * | 1/2014 | Gitschel | C10L 3/106 241/19 |
| 9,573,167 | B2 * | 2/2017 | Marrapodi | B65F 1/0033 |
| 9,707,595 | B2 * | 7/2017 | Ripley | G06K 9/2054 |
| 10,207,296 | B2 * | 2/2019 | Garcia | B07C 5/34 |
| 2012/0010746 | A1 * | 1/2012 | Sundholm | G06Q 50/28 700/226 |

* cited by examiner

DEVICE FOR THE TREATMENT AND SEPARATION OF INORGANIC SOLID WASTE

FIELD OF THE INVENTION

The present invention relates to a device for the treatment and separation of inorganic solid waste. In particular, inorganic solid waste means domestic waste, for example glass, plastic and other, generated, again by way of example, from homes or small businesses, such as bars, restaurants, pizzerias, hotels, or entities that may be beneficiaries of the invention. The device may be used both in the domestic area and in other areas. In addition to a fixed location, the device according to the invention may also be installed on mobile vehicles, which are designed for collecting and/or processing waste.

PRIOR ART

As is known, currently the waste generated is tending to increase. In every country, environmental regulations have contributed significantly to the introduction of sustainable waste management practices. However, the recycling rate remains far from the target set by the institutions, with a significant impact on local governments that generally persist in using the many landfills. Their goal is to increase the recycling rate in the short term, reducing to a minimum term the use of landfills.

Waste disposal has always been a difficult problem. The problem of waste is linked to the persistence in the environment of increasingly large quantities thereof, to the heterogeneity of the materials and, last but not least, to the possible presence of dangerous substances.

At the moment, all over the world, industrial technologies are widespread, capable of processing the whole chain of waste treatment for large volumes (15 tons per hour) of waste.

The industrial processes on large volumes firstly separate waste according to commodity macro-categories (paper, plastic, glass, metal and organic) and then process them into secondary raw materials.

WO2011084078 describes a waste treatment machine and process comprising two steps. In a first step, the waste is subdivided by type and in a second subsequent step, the waste is pressed and ground and finally introduced into respective bags.

WO2013128351 describes an integrated plant which comprises a first machine capable of compacting organic waste and a second machine capable of compacting inorganic waste. The plant may be powered by solar panels or batteries and may be made in different sizes depending on the application.

With regard instead to the treatment of domestic waste, it is the consumer himself who is called upon to make a first differentiation of garbage.

In particular, the first step is managed by the person who produced the waste, who is responsible for the separation thereof, based on some categories of materials (such as glass, paper or plastic). This is the reason why the consumer must use as many containers for collection as how many are the types of waste to be differentiated.

The main actor of the second step is a professional operator, public or private, responsible for secondary treatment of waste previously differentiated by consumers. The second step takes place in factories specialized in differentiation.

The last step is performed by private companies that purchase secondary raw materials produced by the transformation of waste into completely recyclable materials.

To start the recycling process, it is essential that the first step is carried out by the consumer. The motivation and sense of the civic duty of the consumer are crucial for the efficiency of recycling, since an improper primary differentiation gives rise to a dispersion of products that could be reused, with the consequent loss of associated environmental and economic advantages.

The second step, i.e. the transport of pre-differentiated waste to specialized plants for further selection (for example secondary selection of plastics, on the basis of color) and disposal, is the most expensive in terms of economic and environmental impact. There is still no solution to avoid this intermediate step.

In view of the foregoing considerations, the main task of the present invention is to provide a device of limited dimensions capable of producing recyclable waste (secondary raw materials). Within this task, a first object of the present invention is to provide an automatic device for the treatment and separation of inorganic solid waste. Another object is to provide a device capable of carrying out a primary differentiation of waste at the same time as the step managed by the consumer.

Last but not least, an object of the present invention is to provide a device that is reliable and easy to be implemented in a cost-effective manner.

BRIEF SUMMARY OF THE INVENTION

These and other objects are achieved by a device for the treatment and separation of inorganic solid waste which comprises:
  a grinding chamber for obtaining waste fragments from a group of inorganic waste;
  a sieving assembly of the waste fragments generated in said grinding chamber;
  a recognition assembly comprising:
    a recognition plate consisting of a plurality of analysis seats, each of which is designed to accommodate a single fragment generated in said grinding chamber, and sensor means configured to recognize the type of waste of said single fragment;
  a distribution assembly operating between said sieving assembly and said recognition assembly and configured to place each single fragment in one of the corresponding analysis seats defined in said recognition plate;
  a monitoring unit configured to act on the recognition plate so as to deposit each waste fragment in a respective collection bin.

Between the advantages of the invention it has to highlighted how it allows treating and separating solid inorganic waste by performing, in succession, at least the steps of volumetric reduction of waste, of recognizing the type of waste of each individual fragment and of separating such fragments by type into as many respective bins.

The invention also provides a device for waste treatment intended to work completely in the same place where primary waste is produced, with evident advantages in reducing transport and processing costs. The device may also be used in domestic area.

Innovatively, compared to the widespread industrial processes, the order of operations performed by the device of the invention is almost inverse with respect to the order of operations normally performed on waste in the processing centers of the recycling chain.

The device comprises a sole support structure which supports at least the grinding chamber, the sieving assembly, the recognition assembly and the bins, with a vertically oriented arrangement. An advantage of this embodiment is given by the fact that the whole process develops within a single structure, which can be considered the waste treatment area, where the transformation thereof into second raw material (End Of Waste—EOW) takes place.

Moreover, the whole process takes place within a limited volume in space, i.e. rather small to make it suitable for non-industrial structures and allows the use of gravity to facilitate the movement of waste fragments downwards.

Another advantage is that with this system, waste becomes a marketable commodity instead of a burden to be treated, with savings in direct, indirect and social costs.

One embodiment of the invention provides for the grinding chamber to have a cylindrical configuration closed, at the upper and lower bases, by an upper grinding element and a lower grinding element, respectively. The upper and lower grinding elements are provided with moving means for causing a mutual approach movement and rotation means for causing a mutual rotation movement. The movement means and the rotation means are preferably controlled independently by the monitoring unit.

An advantage of this embodiment is that, due to the reciprocal approach movement of the upper and lower grinding elements, the compression force necessary to crush and compact the waste is generated. Due to the mutual rotation movement, a cutting force is generated. Compression forces allow compressing the glass until breaking while the cutting forces chop and grind plastics and other materials.

One aspect of the invention provides that the upper and lower grinding elements are provided with interchangeable pyramidal elements to carry out a cutting action on the waste. An advantage of this embodiment is that it allows obviating the fact that the grinding stresses of the waste, which mainly concentrate on the tip and on the edges of the pyramids, make the grinding chamber less effective with use over time.

According to another aspect, the sieving assembly comprises at least a first sieving element at a base of said grinding chamber. This first sieving element, preferably, comprises a plurality of holes having the same diameter. Even more preferably, said base of the grinding chamber is defined by the lower grinding element. Therefore, said holes are made through said lower grinding element. Therefore, a first dimensional selection of the fragments generated in the grinding chamber is advantageously carried out at the same grinding chamber.

One embodiment of the invention provides that the sieving assembly comprises a plurality of helix elements, each helix element comprising a plurality of through holes, which have the same size. An advantage of this embodiment is that each of the helices of the sieving assembly is adapted to select waste fragments having similar particle size.

One embodiment of the invention provides that said helix elements are coaxial. The helix elements are arranged vertically on top of one another so that each helix, following a preceding one, has holes smaller than the size of the helix holes immediately above it. An advantage of this embodiment is that it allows the entire sieving assembly to select the waste fragments in different categories characterized by having different particle size.

In an embodiment of the invention, said sieving assembly comprises a selection plate divided into a number of sectors equal to the number of helix elements of the sieving assembly; and each helix elements of the sieving assembly meets the selection plate at an aligned group of holes passing through the same selection plate. In particular, the holes of each group are arranged for the collection of single fragments of waste characterized by a similar particle size.

An advantage of this embodiment is that it allows organizing the waste fragments on the selection plate according to different particle size categories.

According to an embodiment of the invention, the distribution assembly comprises components capable of supplying the recognition plate with single fragments of waste; these components are cylinders placed horizontally which have seats on the lateral surface. The seats placed at the through holes of the selection plate allow the collection of the single fragments. Then, through a rotation of such a cylinder along its longitudinal axis, the single fragments are deposited, by gravity, in the corresponding analysis seats of the recognition plate.

An advantage of this embodiment is that it allows preserving the order of the selection of the waste fragments according to the particle size categories previously created by the sieving assembly. At the same time, the selection cylinders deposit a single fragment in a corresponding analysis seat of the recognition plate. This results into the possibility of carrying out, through the sensor means, a specific analysis of each fragment generated in the grinding chamber.

According to an embodiment of the invention, the device comprises a fragment washing assembly operatively interposed between the grinding chamber and the recognition assembly. An advantage of this embodiment is that it allows the fragments to be washed with water and sterilizing substances, which can also remove the glues present on some types of plastics.

Subsequently each fragment is allowed to fall on the hole of the underlying recognition plate, perfectly aligned.

One embodiment of the invention provides that the recognition plate is capable of rotating to present each single waste fragment in correspondence of the sensor means.

Another embodiment of the invention provides that the sensor means comprise a sensor capable of detecting the weight and volume of each single waste fragment. An advantage of this embodiment is that it is simple to apply and develop, even considering that in addition to a volumetric detector and a scale, it is necessary to introduce a color sensor for the separation of the shades.

According to an embodiment of the invention, the sensor means comprise a sensor capable of detecting the image of the molecular structure of each single waste fragment.

According to another embodiment of the invention, the sensor means comprise a spectrometric sensor, which allows measuring the spectrum of the electromagnetic radiation, that is to say, the properties of light according to its wavelength.

An advantage of these last two alternative embodiments is that they both allow identifying the specific features of each single fragment with extreme precision and speed.

Finally, another embodiment of the invention provides that each hole of the recognition plate has a respective flap which can be opened downwards and that the control unit is configured to act individually on each single flap so as to deposit the corresponding fragment of inorganic waste in the desired bin. An advantage of this embodiment is that it allows arranging a plurality of containers, each one being filled with a different type of END OF WASTE.

Further features of the invention are described in the dependent claims.

BRIEF DESCRIPTION OF THE FIGURES

Further features and advantages of the invention will become apparent from the following description, provided by way of non-limiting example with the aid of the figures shown in the accompanying drawings, in which.

DETAILED DESCRIPTION OF SOME EMBODIMENTS OF THE PRESENT INVENTION

Figure 1:
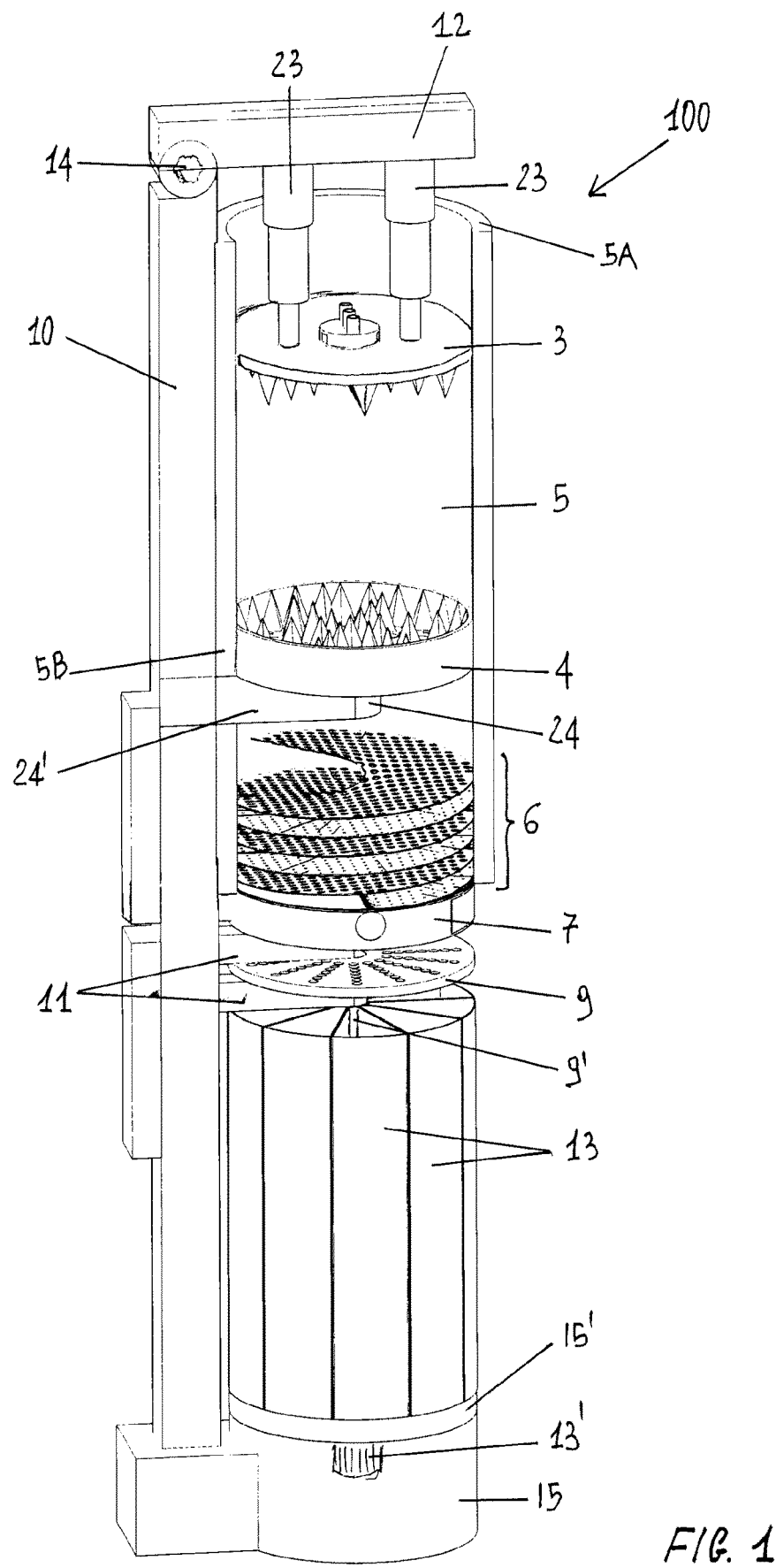
FIGS. 1 and 1A are two perspective sectional views of a device for the treatment and separation of solid waste according to an embodiment of the invention.
Figure 1A:
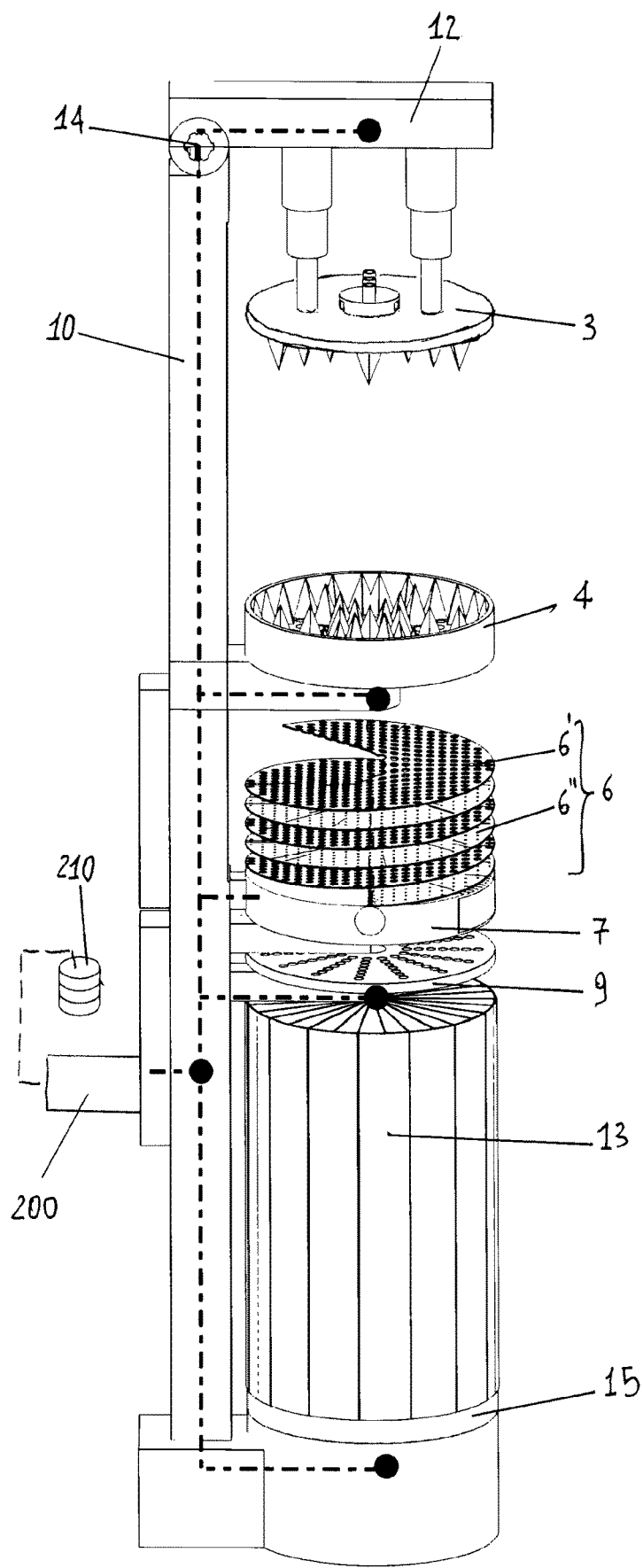

The invention will now be described with initial reference to FIGS. 1 and 1A which illustrate an embodiment of the present invention, globally indicated with numeral reference 100.

The device 100 for the treatment and separation of inorganic solid waste provides a support structure 10, external to the volume in which the operations of the device 100 occur; this structure comprises a support base 15 which sustains and supports the various operating assemblies of the device 100, arranged in a vertical direction, through arms which extend horizontally from the support structure 10.

The skeleton of the machinery, in addition to ensuring stability and balance, allows the actuators to be powered to move the transmission members, exploiting the spaces inside the structure itself.

The device 100 is powered exclusively by electricity, but to maximize efficiency and effectiveness, there are pneumatic, hydraulic and mechanical systems: this hybrid system allows reducing the consumption of energy absorbed by all the machinery, distributing the power only where it is necessary and allows minimizing the overall dimensions, in particular those present in the processing volume.

The movement of the material inside the processing area is divided into primary and secondary. A single power generator on the base feeds the primary actuators which, in turn, due to a battery pack recharging system, allow the secondary movement.

Firstly, the device 100 comprises a grinding chamber 5, preferably in the form of a cylinder, closed at its upper 5A and lower 5B bases, respectively, by an upper grinding element 3 and a lower grinding element 4. The latter is supported by an arm 24' which departs horizontally from the support structure 10. The grinding chamber 5 is shown in a sectional view in FIG. 1, while it is not shown in FIG. 1A.

In particular, the upper grinding element 3 is connected to a support element 12 which can rotate with respect to the support structure 10 around a hinge where a rotary actuator 14 is provided so as to allow opening of the grinding chamber 5 and the relative insertion of the waste to be ground.

As better illustrated hereafter, the grinding chamber 5 is capable of reducing the waste to a ground set of particles or fragments of a diameter not greater than a predetermined size.

Below the grinding chamber 5 there is a sieving assembly 6 whose function is that of subdividing the fragments according to their size. Preferably, said sieving assembly 6 comprises a first sieving/selection element consisting of the base of the grinding chamber and more precisely of the lower grinding element. Holes 21 are defined through this element substantially with the same diameter. Therefore, only the fragments with a maximum size equal to or smaller than that of the holes can cross the holes themselves to be subsequently analyzed. The largest fragments will remain inside the chamber 5 to be reduced in the subsequent grinding.

Preferably, the sieving assembly 6 also comprises a plurality of helix elements 6', 6" which together define a system for sieving the waste fragments obtained by means of the aforementioned grinding according to their relative dimensions. The size of the fragments taken into consideration ranges from 1 cm to 1 mm.

Figure 7:
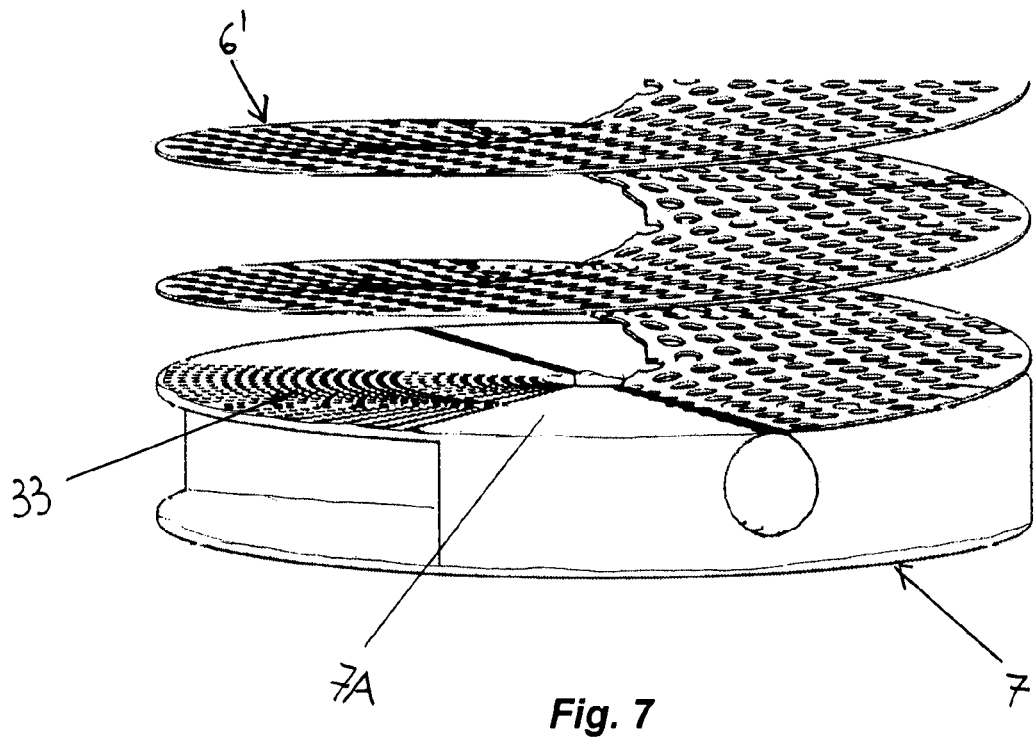
FIG. 7 is a perspective bottom view of a sieving assembly according to the invention.

The sieving assembly 6 further comprises a selection plate 7, of circular shape, divided into as many sectors as the helix elements 6', 6" indicated above, in such a way that on the joining line between a given helix element 6', 6" and the selection plate 7 are deposited only the fragments with similar particle size. In this regard, FIG. 7 refers to the positioning of a helix element (indicated with 6') with respect to the selection plate 7, which is clearly visible in FIG. 8. As illustrated, the helix element 6' meets the selection plate 7 in correspondence of a group of holes 35 aligned along a radial direction.

Figure 8:
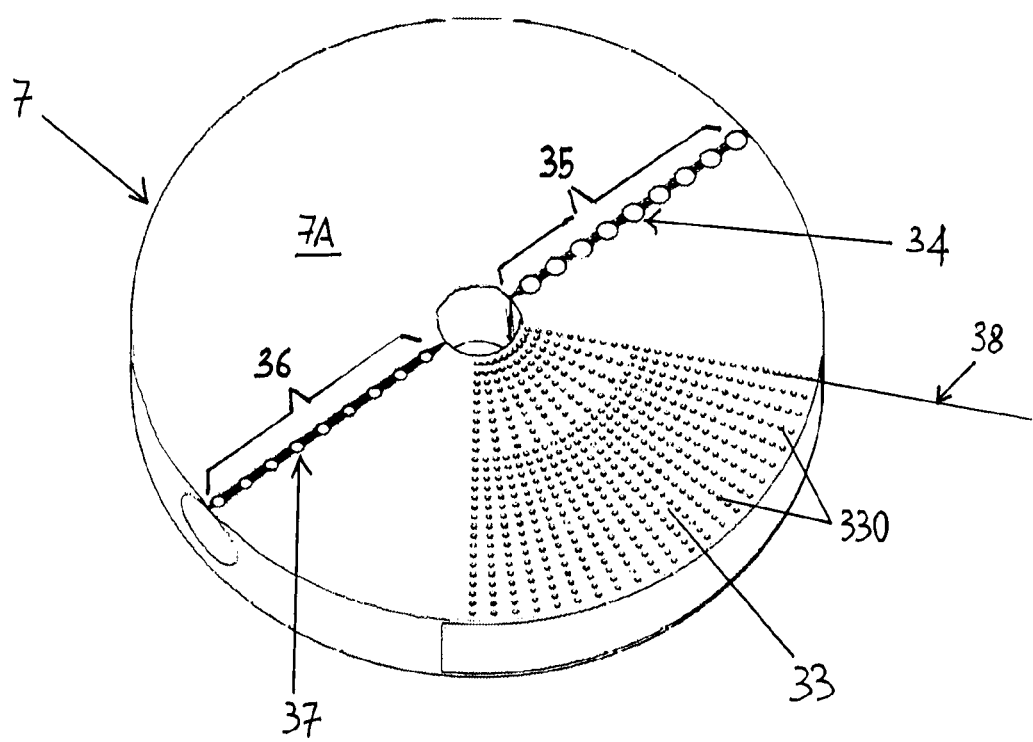
FIGS. 8, 9 and 10 are views relating to a selection plate of a sieving assembly of a device according to the invention.

In the embodiment in FIG. 8, the selection plate 7, which is fixed, has two groups 35, 36 of holes arranged in two rows. Therefore, two helix elements 6, 6' are provided. Again with reference to FIG. 8, the assembly 35 has holes 34 which are placed on the connecting line of a first helix element 6', while the group 36 has holes 37 which are placed on the connecting line of a second helix element 6" and having a diameter smaller than the holes 34 of the group 35.

In many embodiments of the invention, the helix elements 6, 6', 6" may be in a number greater than two, or up to five or more, preferably from three to five. Each of these helix elements 6, 6', 6" will be associated with a respective group of holes on the selection plate 7.

In the embodiment shown in FIGS. 7 to 10, the selection plate 7 also has a collection sector 38 provided with drainage holes 33 and belonging to a washing assembly of the waste fragments, described hereinafter.

Figure 9:
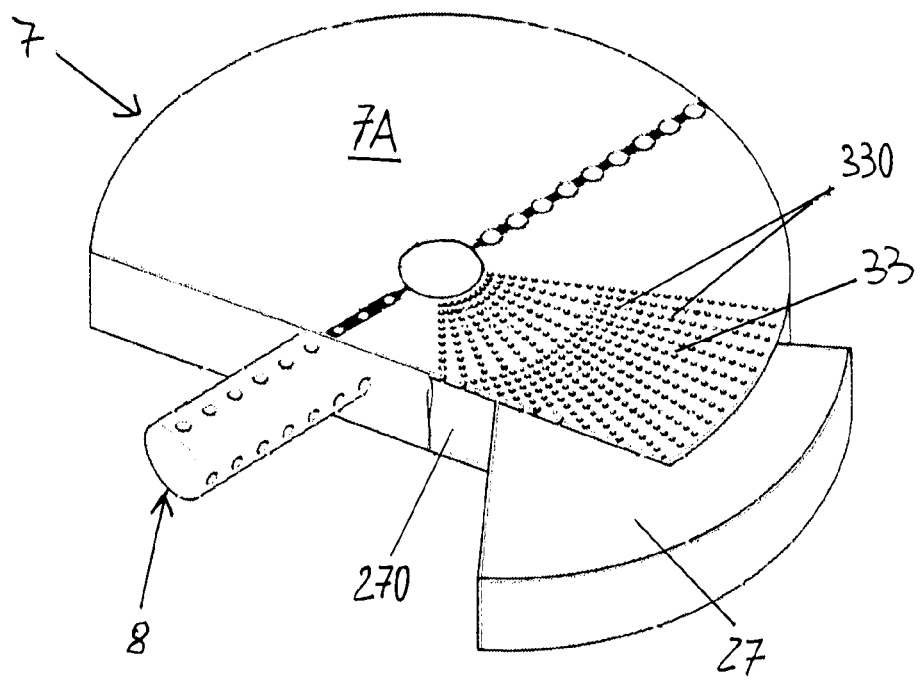
Figure 10:
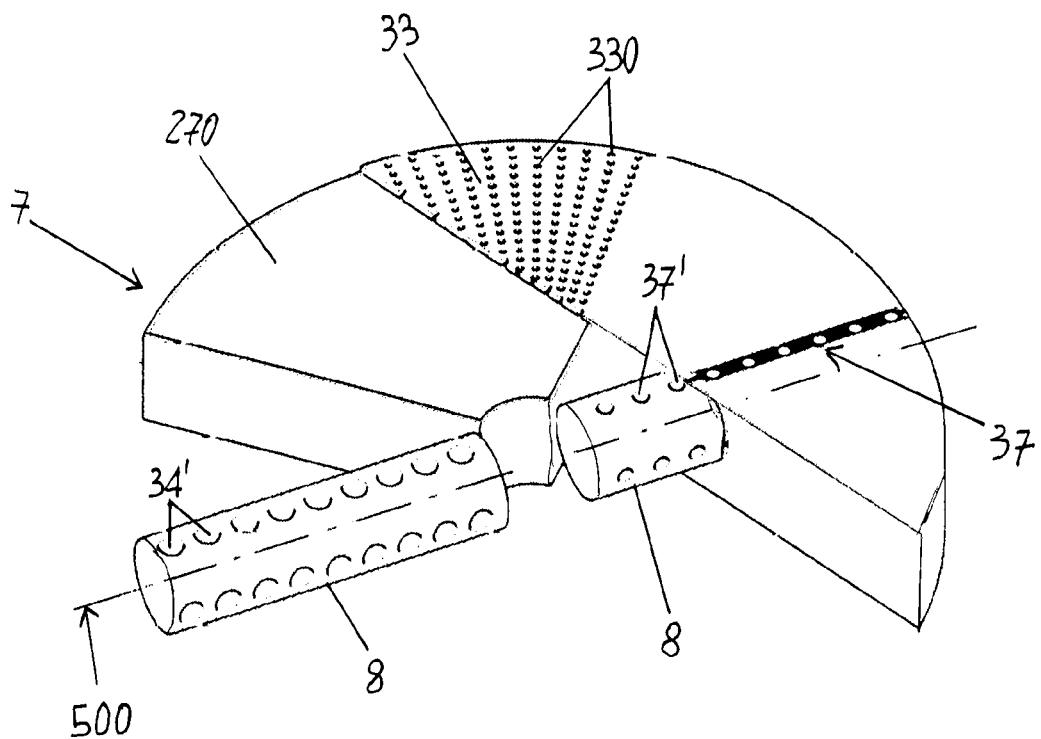

With reference in particular to FIGS. 9 and 10, movable components of the distribution assembly are inserted inside the selection plate 7, in particular consisting of distribution cylinders 8 arranged along a radius of the selection plate 7. The distribution cylinders 8 are at least in number equal to the number of the helix elements 6', 6" of the sieving assembly 6 and have at least one row of recesses 34', 37' along a generatrix of their lateral cylindrical surface.

In an angular position of the cylinder, evaluated around its longitudinal axis, the recesses 34', 37' of the distribution cylinders, due to their geometry, are aligned with the holes 34, 37 present on the selection plate 7 so as to receive the corresponding fragments.

The distribution cylinders 8 are subsequently rotated along their own longitudinal axis to transport the waste fragments from the selection plate 7 towards a recognition plate 9 of a fragment recognition assembly described below. Overall, the distribution cylinders 8 configure a distribution assembly which cooperates with the sieving assembly 6 with the aim of selecting only one fragment at a time. This is to prevent two fragments of different materials from being identified simultaneously and therefore incorrectly.

In an alternative embodiment, the distribution cylinders 8 may be external to the selection plate 7, for example placed in a position below it.

In any case, these cylinders 8 are oriented so that for each cylinder the relative holes 34', 37', defined along a generatrix of their cylindrical lateral surface, are aligned with the holes 34, 37 of a group 35, 36 present on the selection plate 7. For each cylinder 8, this alignment condition is assumed when the cylinder 8 reaches a certain angular position evaluated with respect to its longitudinal axis 500 of rotation.

As indicated above, the device 100 comprises a fragment recognition assembly, placed in a position below the distribution assembly and comprises a recognition plate 9 which defines a plurality of analysis seats 28; each seat 28 is sized to accommodate a single fragment deposited by the distribution assembly. The recognition plate 9 is capable of transporting each individual fragment in correspondence of sensor means 11 for recognizing the type of waste of each individual fragment. This recognition is made on the basis of one or more chemical-physical properties and/or features of the fragment.

According to another aspect, the device 100 comprises a washing assembly operatively interposed between the grinding chamber and the sieving assembly 6 for the purpose of washing the fragments generated in the grinding chamber. In particular, the waste fragments can be washed with water and sterilizing substances, capable of removing also the glues present on some types of plastics and of being dried with a jet of pressurized air.

Finally, below the recognition assembly, comprising the recognition plate 9 and the sensor means 11, there is a plurality of bins 13, each one designed to receive a certain type of waste. These bins 13 are preferably placed on a rotating plate 15' and the weight and the state of filling of the single bin 13 is monitored by means of scales.

As better explained hereafter, due to the sensor means 11, the recognition plate 9 is capable of discharging each single fragment in the respective bin 13.

The actuators of the device 100 are controlled by an electronic monitoring and drive unit 200 (or electronic control unit 200), for example an industrial PC. This unit 200 can be programmed, even remotely, so as to confer high versatility and flexibility to the device according to the invention. A computer program, for example stored in a memory unit 210, connected to the unit 200, determines the various drives of the device 100 as illustrated below.

Figure 2:
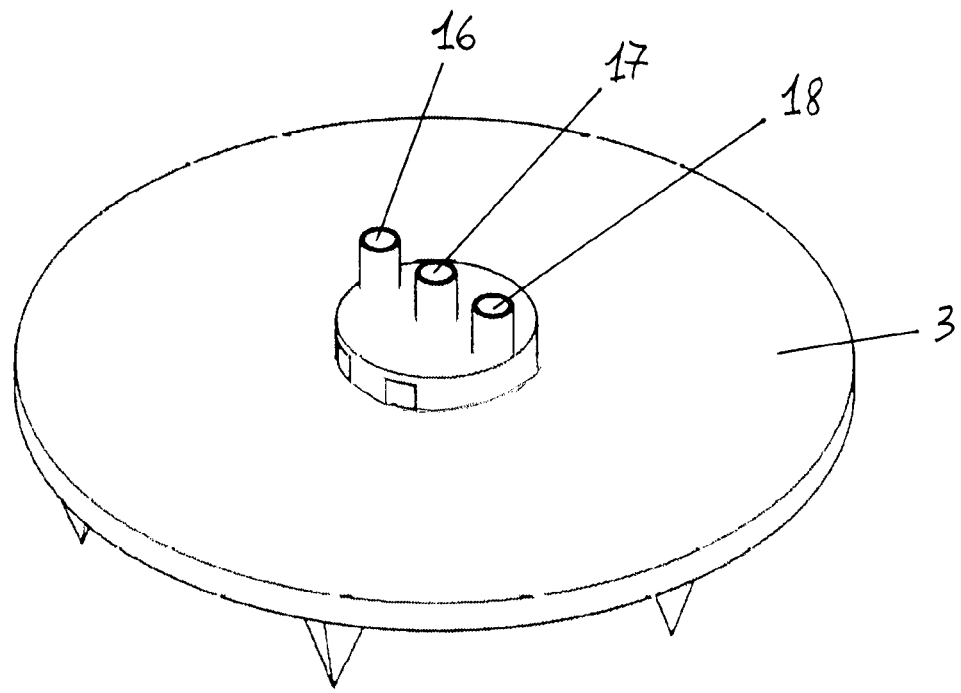
FIGS. 2 and 3 are perspective views from different viewing points of an upper grinding element of a device according to the invention.
Figure 3:
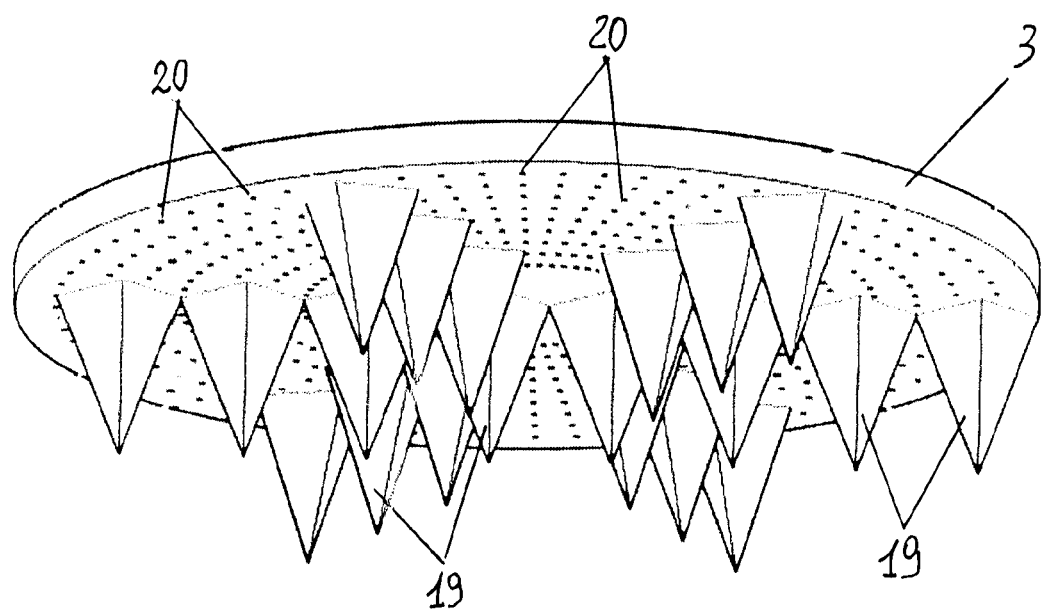

The upper grinding element 3 is now described in more detail with particular reference to FIGS. 2 and 3, which show a top perspective view and a bottom perspective view thereof, respectively.

In the upper part of the upper grinding element 3 there are three different empty spaces which allow the entry of air 16, water 17 and chemical solutions 18 which feed the washing assembly. Furthermore, the upper grinding element 3 seen from below (FIG. 3) has a plurality of holes 20 for the entry of these fluids into the grinding chamber 5. Also in FIG. 3 it is possible to see a plurality of teeth 19 which can have a pyramidal or rhomboidal shape and which are capable of pressing the waste.

Figure 4:
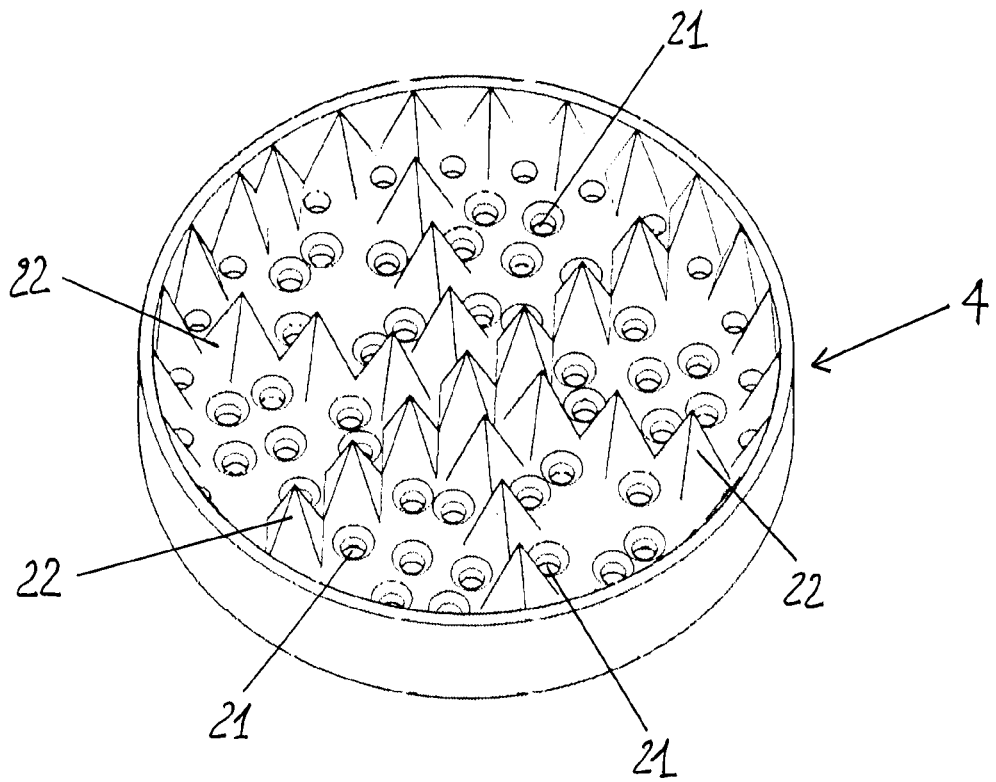
FIG. 4 is a top view of a lower grinding element of a device according to the invention.

FIG. 4 is a top view of the lower grinding element 4 in which there are also pyramidal (or rhomboidal) teeth 22 and holes 21 for the passage of the granular waste towards the group of helix elements 6', 6" of the sieving assembly 6.

The two grinding elements 3 and 4 are complementary. They are arranged one on top of the other with the center passing through the same axis.

The pyramid elements 22, 19 of the two grinding elements 3 and 4 can be interchangeable.

As the grinding efforts of the waste concentrate mainly on the tip and on the edges of the pyramids, these must be easily interchangeable, replaceable and regenerable.

Two linear actuators 23 fixed to the arm 12 allow a downward stroke, for example of about 40 cm, of the upper grinding element 3, stroke which generates the compressive force necessary to crush and compact the waste. To reduce the overall dimensions, the linear actuators 23 are concealed, for example implemented by means of double-acting telescopic pistons.

The cutting force is instead generated by a rotary actuator 24 located on the end of the second arm, at the end of the stroke of the linear actuators 23.

In particular, the crushing of waste occurs through the combination of several forces that have the objective of transforming the different materials into a granulate of less than one centimeter. These forces can be decomposed into normal forces and cutting forces: the former allow the glass to be compressed until breaking and the latter crush and chop the plastics and other materials.

The volumetric reduction step is the one that requires the greatest amount of energy and in order to ensure reliability and speed in the process, the forces are generated separately so that they can be managed in a combined or individual manner.

This step is also independent of the subsequent steps.

The reasons for this choice depend on two factors: (1) prevent the formation of queues in the bin; at any time, the machinery is ready to receive waste; (2) neglecting the time variable with regard to washing, sterilization, recognition and separation which are finely synchronized to ensure other steady-state performance and the use of a single moving source.

The part of the device 100 downstream of the grinding chamber 5 could also be separated from it and operate autonomously only on the waste fragments for their selection.

The volumetric reduction step allows the waste to be crushed, thus treating fragments which, taken individually, have a low weight and a very low overall dimension. The ease of moving that results from these features allows minimizing the space and the total energy absorbed by the whole process.

Figure 5:
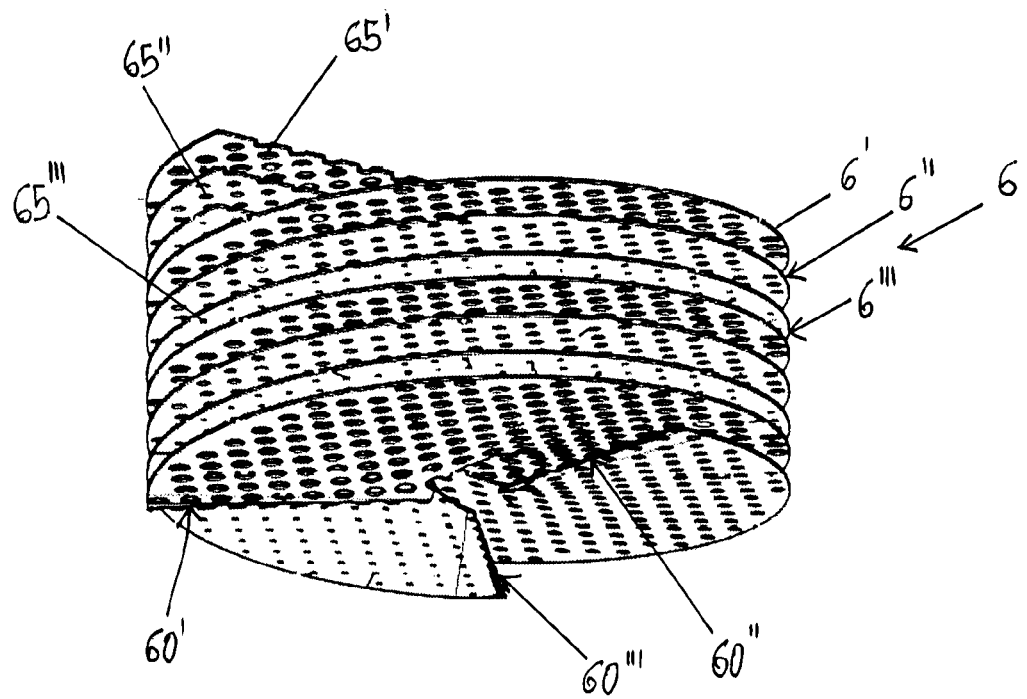
FIGS. 5 and 6 are perspective views from different viewing points of helix elements of a sieving assembly of a device according to the invention.
Figure 6:
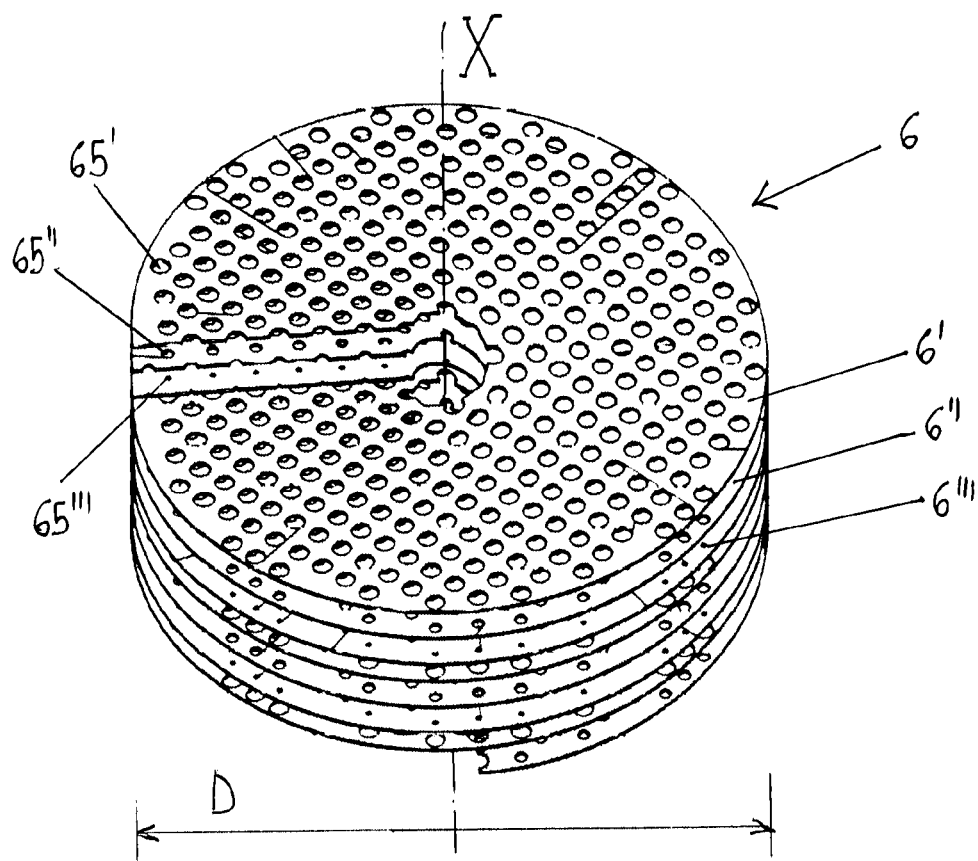

FIGS. 5 and 6 are perspective views of three helix elements 6', 6", 6''' of a sieving assembly 6 of the waste fragments. These elements 6', 6", 6''' develop in such a way as to be coaxial to the same axis X. Each helix element 6', 6", 6''' essentially constitutes a filter which implements a dimensional selection of the fragments. In detail, each filter is defined by a helix structure whose surface is each provided with holes 65', 65", 65''' where the holes belonging to each of the helix elements have the same size.

The three helix elements 6', 6", 6''' meet the same surface 7A as the selection plate 7. In particular, each of the helix elements 6', 6'', 6''' defines a corresponding lower edge 60', 60'', 60''' intended to meet said surface 7A of the selection plate 7.

Each of the three helix elements 6', 6'', 6''' has a vertical extension (height) different from that of the other elements, where this height is evaluated with respect to the surface 7A of the selection plate 7 and in a direction parallel to the axis X around which the surfaces of the helix elements 6', 6'', 6''' develop. In particular, a first helix element 6' has a greater height than a second helix element 6'' which in turn has a greater height than a third helix element 6'''. Preferably, the surface of the three helix elements 6', 6'', 6''' defines a same outer diameter D (shown in FIG. 6).

Advantageously, the surface of the first helix element 6' defines first holes 65' having a larger dimension than that of second holes 65'' defined through the surface of the second helix element 6''. In turn, the size of said second holes 65'' is greater than the dimension of third holes 65''' defined through the surface of the third helix element 6'''. This principle is repeated if the helix elements are more than two.

The waste fragments coming from the grinding chamber follow the path of the first helix element 6' sliding on its surface. If these fragments are larger than the holes 65' of this first element, they continue in their helix path until they meet the connecting line between the same first helix element 6' and the surface 7A of the underlying selection plate 7.

If, on the other hand, said fragments have dimensions smaller than those of the first holes 65', but not smaller than those of the second holes 65'' of the underlying helix element 6'', they fall through the holes 65' on said second helix element 6'' and continue in their helix path until they meet the connecting line of the helix element 6'' with the underlying selection plate 7. In the case in which the fragments have a smaller dimension than that of the second holes 65'' too, then they fall on the surface of the third helix element 6''' according to the same principle.

Preferably, the sieving assembly 6 is vibrated to facilitate movement of the waste fragments. Therefore, the helix shape of the elements 6', 6'', 6''' and the vibration thereof allow a radial positioning of the fragments on the underlying selection plate 7, subdividing them by size.

The selection plate 7 comprises a number of groups or lines of holes 34, 37, equal to the number of helix elements 6', 6'', 6'''. Each line of holes 34, 37 delimits one of these sectors and in a position below each line of holes 34, 37 a distribution cylinder 8 is provided.

Preferably, each cylinder 8 is inserted in a seat radially developing in the selection plate 7. In this way, the longitudinal axis 500 of the cylinder is positioned in a radial direction. In any case, each cylinder 8 comprises a plurality of recesses 34', 37' arranged along a generatrix of the cylinder itself. Each cylinder 8 is controlled to rotate about its longitudinal axis 500. More precisely, in at least one angular position, the recesses 34', 37' are aligned with corresponding holes 34, 37 of the selection plate 7 to accommodate single waste fragments. Following the rotation about its longitudinal axis 500, each cylinder 8 can take a second angular position at which the fragments contained in each of the recesses 34', 37' are deposited in a corresponding analysis seat 28 of the recognition plate 9.

The purpose of the distribution cylinders 8 is therefore to separately isolate waste fragments having the same size so that each fragment can be analyzed by the sensor means 11 for the correct determination of the material of which they are made.

When the distribution cylinder 8 reaches the first angular position indicated above, the recesses 34', 37' are aligned with the holes of the corresponding line of holes 34, 37 (referring to a corresponding helix element 6', 6'') and allow only a single fragment to enter at a time. Following a 180° rotation around its longitudinal axis 500, each of the recesses 34', 37' aligns with a corresponding analysis seat 28 defined on the recognition plate 9 so that said single fragment is analyzed independently of the others.

In detail, the recognition plate 9 is provided with individual seats 28, where each seat 28 is sized to accommodate a single fragment. The recognition plate 9 is capable of rotating about a vertical axis X' thereof due to a rotary actuator 9' (indicated in FIG. 1) to carry each single fragment in correspondence of the recognition means 11 which detect the type of material thereof. Preferably, this axis of rotation X' is aligned with the axis X around which the helix elements 6', 6'', 6''' develop.

Once the type of material of the fragment has been recognized, it is discharged in correspondence of the bin 13 arranged for the collection of the same second raw material, which is therefore ready to be sold to the highest bidder.

Figure 11:
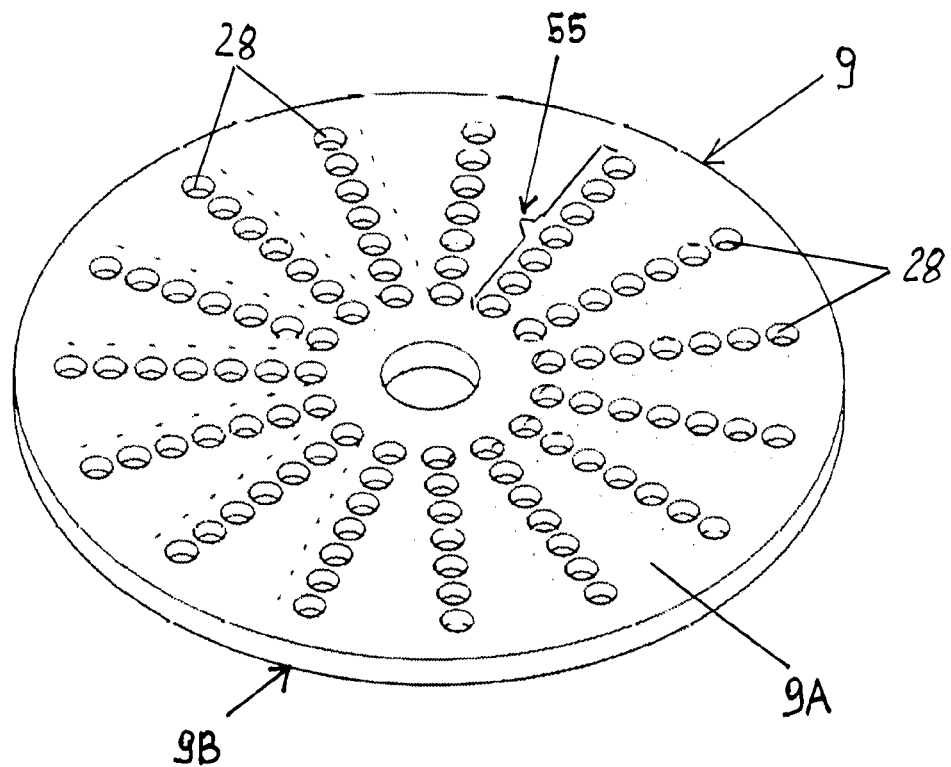
FIGS. 11 and 12 are a perspective view and a sectional view, respectively, of a component of a recognition assembly of a device according to the invention.
Figure 12:
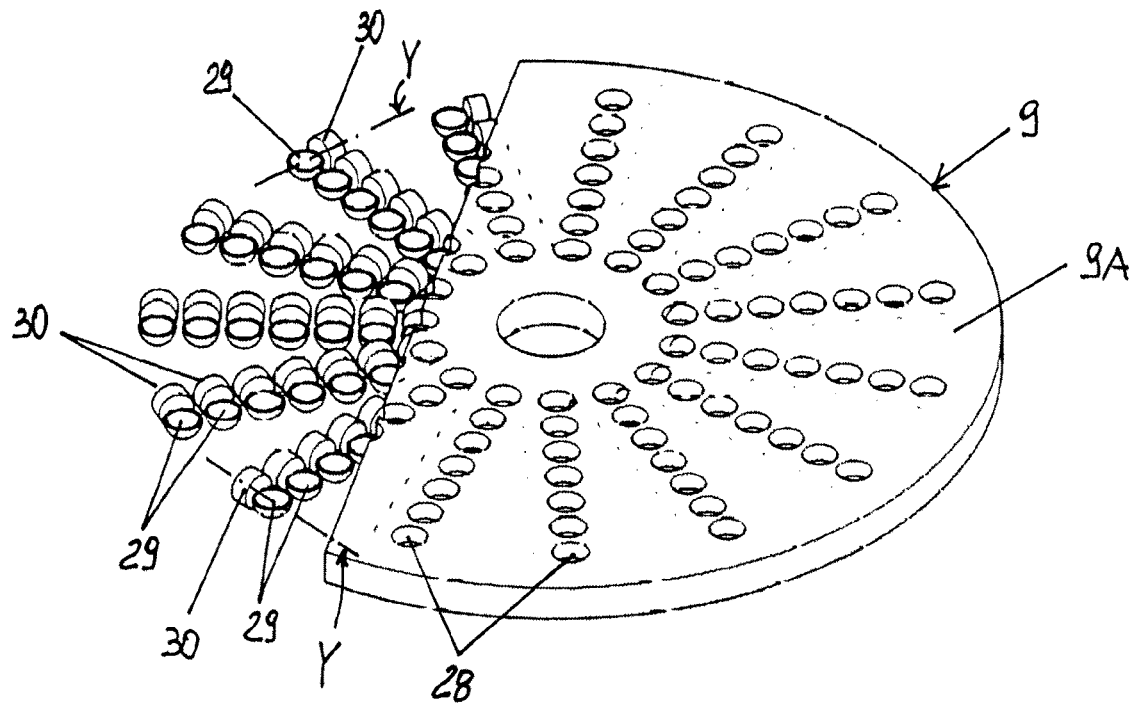

In this regard, the perspective view in FIG. 11 and the sectional view in FIG. 12 show a possible embodiment of a recognition plate 9. The latter comprises a first face 9A which in use remains facing the selection plate 7 defined above. The seats 28 extend from said first face 9A in the direction of a second face 9B of the recognition plate 9, opposite to the first face 9. As can be seen, the seats 28 are arranged in groups 55, where for each group the relative seats 28 are aligned along a radial direction evaluated with respect to the vertical axis X' around which the recognition plate 9 develops. Preferably, the number of seats 28 is the same for each of said groups 55.

According to another aspect, each seat 28 comprises a bottom portion 29, preferably concave upwardly, to which an electric actuator 30 is connected, which is configured to rotate the bottom portion about a rotation axis Y, between a closed position and an open position. In the closed position, the bottom portion 29 closes below the corresponding seat 28 so that the fragment released by the distribution assembly remains inside the seat itself. Following rotation towards the open position, the same fragment may fall into one of the collection bins 13 arranged below the recognition plate 9.

As can be seen in FIG. 12, for each group 55 of analysis seats 28, a battery of electric actuators 30 is therefore provided, each for rotating a corresponding bottom portion 29 of a corresponding analysis seat 28. Preferably, the electric actuators 30 are accommodated in suitable housings defined in the body of the recognition plate 9 on the side corresponding to the second face 9B of the plate itself.

In any case, the monitoring unit 200 is configured to act individually on each single electric actuator 30 in order to rotate the corresponding bottom portion 29 so as to deposit the corresponding inorganic waste fragment into the desired bin 13.

Figure 13:
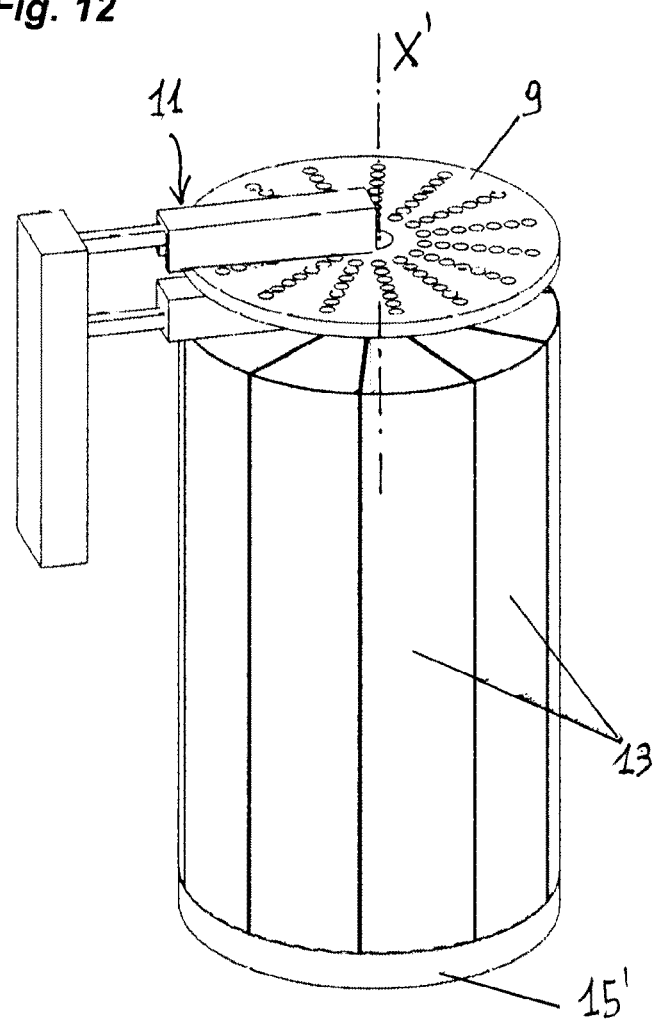
FIGS. 13 to 15 are perspective views relating to a recognition assembly of a device according to the present invention.

Advantageously, the bins 13 may be placed on a rotating plate 15' around an axis preferably coaxial with the rotation axis of the recognition plate 9. Such a rotary plate 15' is supported by the support base 15. As can be seen in FIG. 13, the bins 13 may be configured in the form of internally hollow prismatic elements having a cross-section in the form of a circle sector. The fragments are collected within the cavity of such prismatic elements.

Figure 14:
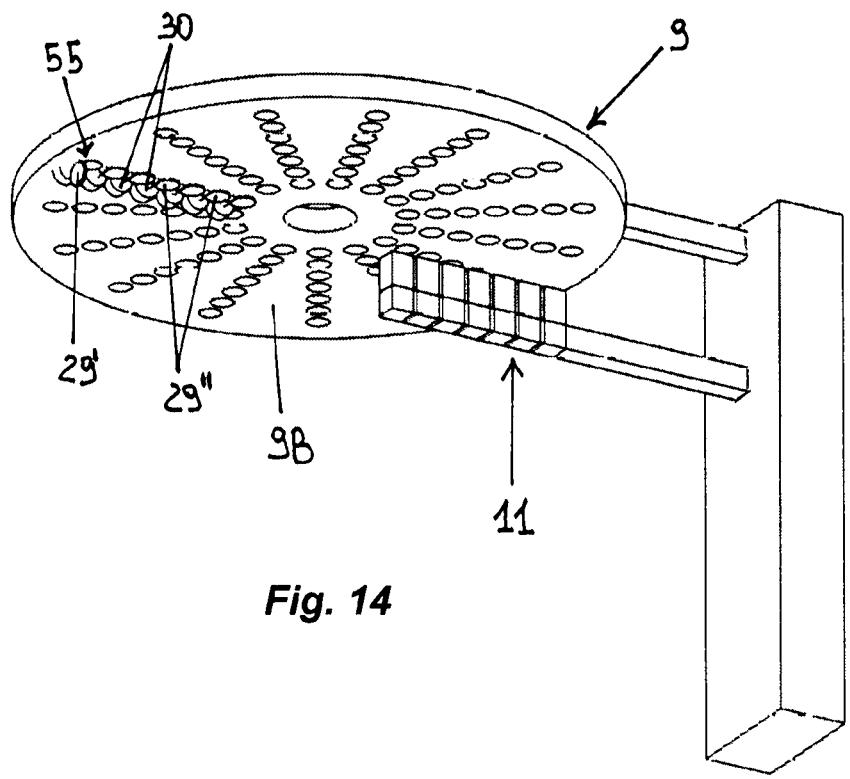
Figure 15:
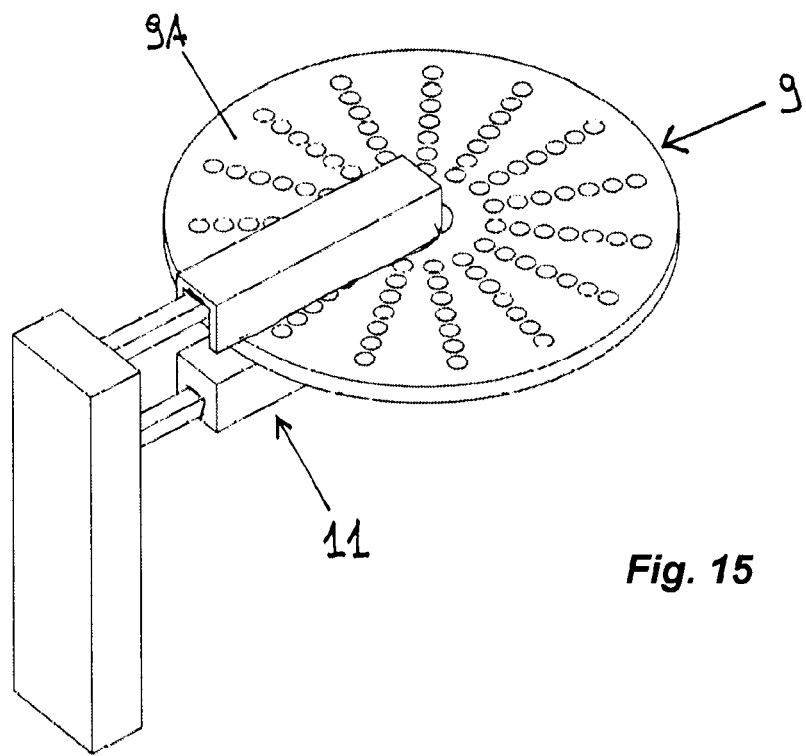

In FIGS. 13 to 15, it is possible to see an embodiment of the recognition assembly in which the recognition plate 9 has the configuration described above and in which the sensor means 11 are installed in a fixed position with respect to the axis of rotation X' of the recognition plate 9. Preferably, the sensor means 11 are configured so as to simultaneously analyze the fragments contained in the analysis seats 28 of the same group, when said group reaches said sensor means 11, following the rotation of the recognition plate 9 around the axis of rotation X'.

According to a preferred embodiment, for each rotation of the recognition plate 9, the bins 13 make two turns in the opposite direction, such that at each quarter of rotation of the recognition plate 9, each group 55 of seats 28 will be moved in correspondence of all the bins 13. Therefore, when fully operational a continuous process of reading and immediate unloading of the fragments takes place.

To speed up this process, each electric actuator 30 is operated by the monitoring unit 200 independently of the others. In particular, each analysis seat 28 is managed independently of the others and the rotation of the relative bottom portion 29 is controlled solely on the basis of the analysis of the fragment carried by the sensor means and based on the position occupied with respect to the collection bins 13. In this regard, FIG. 11 shows a group 55 of seats 28 in which a bottom portion 29' is rotated, while the bottom portions 29" of the other seats of the same group 55 remain in the closed position.

To detect the type of waste, three recognition technologies are preferably provided with the aim of identifying the material and the color of each fragment:
measurement (mass spectrometer) of weight and volume, from which the specific weight and therefore the type of material are obtained;
image of the molecular structure;
ray sensors in the infrared spectrum.

The first technology is the easiest to develop. In this case, the sensor means 11 comprise a volumetric detector, a scale, and a color sensor for the separation of the shades.

The other two recognition technologies, widely used in the chemical, pharmaceutical, medical and food sectors allow identifying with extreme precision and speed the specific features of each single fragment.

Based on the analysis of the signals coming from the sensor means 11, for example by comparing the spectrum received by the sensor with the spectra of known materials present in a dedicated database, for example contained within the memory unit 210, the monitoring unit 200 operates on the respective electric actuator 30 so as to deposit the corresponding waste fragment in the desired bin 13, in particular by rotating in opening the bottom portion 29 exactly when the bin 13 to which this particular fragment is destined is located in the underlying position.

As already mentioned above, according to another aspect of the invention, the device 100 comprises a washing assembly for washing the fragments. This washing assembly is preferably integrated into the sieving assembly 6 and comprises a continuous helix element, i.e. the surface of which does not comprise holes. This continuous helix element is placed coaxially with the helical elements 6', 6", 6'" of the sieving assembly 6. Similarly, to what is foreseen for the helix elements 6', 6", 6'", the continuous helix element also meets the selection plate 7 in correspondence of a radial joining line 38, indicated by a dashed line in FIG. 8.

More precisely, the continuous helix element is placed vertically in a position such as to collect the cleaning fluids which escape from the grinding chamber 5 through the plurality of holes 21 defined by the first sieving element. These fluids also pass through the holes defined through the surfaces of the helix elements 6', 6", 6'" to subsequently flow along the surface of the continuous helix element up to a collection sector 38 of the selection plate 7. Therefore, the continuous helix element has a vertical extension lower than that of the other helix elements 6', 6", 6'" so that its continuous surface always develops below the surfaces of the other helix elements 6', 6", 6'" which act as filters for the fragments. The collection sector 38 has holes 330 through which the fluids are deposited in a tray 27 housed inside a seat 270 of the selection plate 7 defined precisely at the collection sector 33. The tray 27 may be extractable or alternatively may be connected to a drainage system through a pipe. The bins 13, as well as the water recycling trays, may be easily removed in such a way as to allow an immediate emptying when the maximum filling threshold is reached. Sensors inside each bin 13 warn the user when this level is reached. Of course, changes or improvements dictated by contingent or particular reasons may be made to the invention as described, without thereby departing from the scope of the invention as claimed below.

The invention claimed is:

1. A device for the treatment and separation of inorganic solid waste, comprising:
a grinding chamber for obtaining waste fragments from a group of inorganic waste;
a sieving assembly for the waste fragments generated in said grinding chamber;
a recognition plate defining a plurality of analysis seats, each for accommodating a single fragment generated in said grinding chamber;
one or more sensors configured to detect a type of waste of said single fragment;
a distribution assembly operatively interposed between said sieving assembly and said recognition plate and configured to place each single fragment in a corresponding one of said analysis seats of said recognition plate; and
a monitoring and drive unit configured to act on the recognition plate so as to deposit each waste fragment analyzed in a respective collection bin.

2. The device of claim 1, comprising a sole support structure which supports said grinding chamber, said sieving assembly, said recognition plate and said bins according to an arrangement in a vertical direction.

3. The device of claim 1, wherein said grinding chamber is cylindrical in shape, closed at the upper and lower sides thereof by an upper grinding element and by a lower grinding element, respectively, the upper and lower grinding elements being provided with moving means for causing a mutual approach movement and with rotation means for causing a mutual rotation movement.

4. The device of claim 3, wherein said upper and lower grinding elements are provided with interchangeable pyramidal elements to carry out a cutting action on the waste.

5. The device of claim 1, wherein said sieving assembly comprises at least a first sieving element at the base of said grinding chamber, said first sieving element comprising a plurality of holes having the same diameter.

6. The device of claim 5, wherein said sieving assembly further comprises a plurality of helix elements, each helix element comprising a plurality of through holes, wherein the holes belonging to one of said helix elements have the same diameter.

7. The device of claim 6, wherein said helix elements are coaxial and arranged so that the helixes are vertically arranged on top of one another, and wherein each helix, following a first helix, has holes having a smaller diameter than that of the holes of the helix immediately above.

8. The device of claim 6, wherein said sieving assembly comprises a selection plate divided into a number of sectors equal to the number of said helix elements, and wherein each of said helix elements meets said selection plate at a respective group of through holes of said selection plate, wherein the holes of each group are adapted to collect single waste fragments having similar particle size.

9. The device of claim 8, wherein said distribution assembly comprises distribution cylinders which have holes placed at the through holes of said selection plate for accommodating single waste fragments and which, following a rotation thereof around their longitudinal axis, carry the waste fragments from the holes of one group of holes of said selection plate to corresponding analysis seats of said recognition plate.

10. The device of claim 1, wherein each seat of said recognition plate is provided with a corresponding bottom portion capable of rotating between a closed position and an open position through an electric actuator, and wherein said monitoring and drive unit is configured to act individually on every single electric actuator so as to deposit, based on the information provided by said one or more sensors, the corresponding waste fragment in a corresponding collection bin.

11. The device of claim 1, further comprising:
a washing assembly operatively interposed between said grinding chamber and said recognition plate, and configured to wash the waste fragments.

12. The device of claim 1, wherein said recognition plate is able to rotate to present every single waste fragment for alignment with a respective one or more of the one or more sensors.

13. The device of claim 1, wherein said one or more sensors are configured to detect a weight and volume of every single waste fragment.

14. The device of claim 1, wherein said one or more sensors are configured to detect an image of a molecular structure of every single waste fragment.

15. The device of claim 1, wherein said one or more sensors comprises a spectrometric mass analysis sensor.

16. A method of treatment and separation of inorganic solid waste, comprising:
reducing a group of inorganic waste volumetrically into waste fragments in a grinding chamber;
distributing the waste fragments via a dimensionally selective sieving assembly to a recognition plate defining a plurality of analysis seats, wherein each waste fragment is placed in a corresponding one of the analysis seats;
for each of the plurality of analysis seats, detecting information corresponding to a type of waste of the single fragment accommodated therein; and
acting on the recognition plate so as to deposit each analyzed waste fragment in a respective collection bin corresponding to the type of waste.

17. The method of claim 16, wherein:
the grinding chamber is cylindrical in shape, closed at the upper and lower sides thereof by an upper grinding element and by a lower grinding element, respectively; and
the group of inorganic waste is reduced volumetrically into waste fragments by at least causing a mutual approach movement and a mutual rotation movement of the upper and lower grinding elements.

18. The method of claim 17, wherein:
said upper and lower grinding elements are provided with interchangeable pyramidal elements, and
the group of inorganic waste is reduced volumetrically into waste fragments by further carrying out a cutting action on the waste.

19. The method of claim 16, wherein each seat of said recognition plate is provided with a corresponding bottom portion capable of rotating between a closed position and an open position through an electric actuator, the method comprising:
acting individually on every single electric actuator so as to deposit, based on the detected information corresponding to the type of waste, the respective waste fragment in a corresponding collection bin.

20. The method of claim 16, wherein the detected information corresponding to a type of waste of the single fragment comprises one or more of:
a measurement of weight and volume, from which a specific weight is obtained;
an image of the molecular structure; and
infrared spectrum data.

* * * * *